United States Patent [19]
Yabe et al.

[11] Patent Number: 6,069,929
[45] Date of Patent: May 30, 2000

[54] WIRELESS COMMUNICATION SYSTEM COMPULSIVELY TURNING REMOTE TERMINALS INTO INACTIVE STATE

[75] Inventors: Toshihiro Yabe, Kawasaki; Norio Sasaki, Aomori, both of Japan

[73] Assignee: Fujitsu Limited, Kawasaki, Japan

[21] Appl. No.: 08/916,416

[22] Filed: Aug. 22, 1997

Related U.S. Application Data

[63] Continuation of application No. 07/874,136, Apr. 27, 1992.

[30] Foreign Application Priority Data

Apr. 26, 1991 [JP] Japan .................................. 3-124773

[51] Int. Cl.⁷ ........................................................ H04L 7/00
[52] U.S. Cl. .......................... 375/368; 371/5.5; 455/343; 455/574
[58] Field of Search ...................................... 375/354, 368, 375/369, 227, 222, 316; 455/70, 38.3, 38.2, 205, 343, 574; 371/5.5, 5.3, 5.1

[56] References Cited

U.S. PATENT DOCUMENTS

| | | | |
|---|---|---|---|
| 4,449,248 | 5/1984 | Leslie et al. ............................... | 455/38 |
| 4,450,573 | 5/1984 | Noble . | |
| 4,479,125 | 10/1984 | Mori . | |
| 4,506,262 | 3/1985 | Vance et al. ........................ | 340/825.44 |
| 4,541,091 | 9/1985 | Nishida et al. . | |
| 4,649,538 | 3/1987 | DeLuca et al. . | |
| 4,804,954 | 2/1989 | Macnak et al. . | |
| 4,818,987 | 4/1989 | Ide et al. ............................. | 340/825.47 |
| 4,839,639 | 6/1989 | Sato et al. .......................... | 340/825.44 |
| 4,864,573 | 9/1989 | Horsten .................................... | 371/5.1 |
| 4,875,038 | 10/1989 | Siwiak et al. . | |
| 4,903,335 | 2/1990 | Shimizu ................................. | 455/343 |
| 5,223,827 | 6/1993 | Bell et al. . | |
| 5,274,843 | 12/1993 | Murai et al. ........................... | 455/38.3 |
| 5,296,849 | 3/1994 | Ide ...................................... | 340/825.44 |
| 5,740,529 | 4/1998 | Ide ........................................ | 455/343 |

FOREIGN PATENT DOCUMENTS

| | | |
|---|---|---|
| 999648 | 11/1976 | Canada . |
| 1198168 | 12/1985 | Canada . |
| 1 207 393 | 7/1986 | Canada . |
| 0 071 425 | 2/1983 | European Pat. Off. . |
| 0 363 998 | 4/1990 | European Pat. Off. . |

OTHER PUBLICATIONS

Canadian Intellectual Property Office, Office Action dated Aug. 14, 1997, Examined by Examiner D. Walters for Canadian Application No. 2,066,915, "Wireless Communication System Compulsively Turning Remote Terminals into Inactive States" (Fujitsu Limited—owner).

*Primary Examiner*—Chi H. Pham
*Assistant Examiner*—Bryan Webster
*Attorney, Agent, or Firm*—Staas & Halsey LLP

[57] ABSTRACT

A wireless communication system containing at least one transmission apparatus and at least one communication terminal. The transmission apparatus transmits a wireless signal representing a bit sequence containing at least a predetermined number of bit errors, to the communication terminal. The communication terminal receives the wireless signal to regenerate the bit sequence. The communication terminal then examines the bit sequence represented by a received wireless signal to determine whether or not the number of bit errors contained in the bit sequence is equal to or greater than a predetermined number. When it is determined that at least the predetermined number of bit errors are contained in the bit sequence represented by a received wireless signal, the operation of the communication terminal is made inactive. Further, the transmission apparatus may transmit a wireless signal representing a bit sequence containing no pattern coinciding with a predetermined frame synchronization pattern, to the communication terminal. The communication terminal receives the wireless signal to regenerate the bit sequence. The communication terminal then examines the bit sequence represented by a received wireless signal to determine whether or not the bit sequence contains the predetermined frame synchronization pattern. When it is determined that the bit sequence does not contain the predetermined frame synchronization pattern, the operation of the communication terminal is made inactive.

6 Claims, 9 Drawing Sheets

0 1 1 1 1 0 0 1 1 0 1 1 0 1 0 0 1 0 0 0 0 1 0 1 0 1 1 1 0 1 1 0 0 0

0 1 1 1 1 0 1 0 1 0 0 0 1 0 0 1 1 0 0 0 0 1 1 0 0 1 0 1 1 1

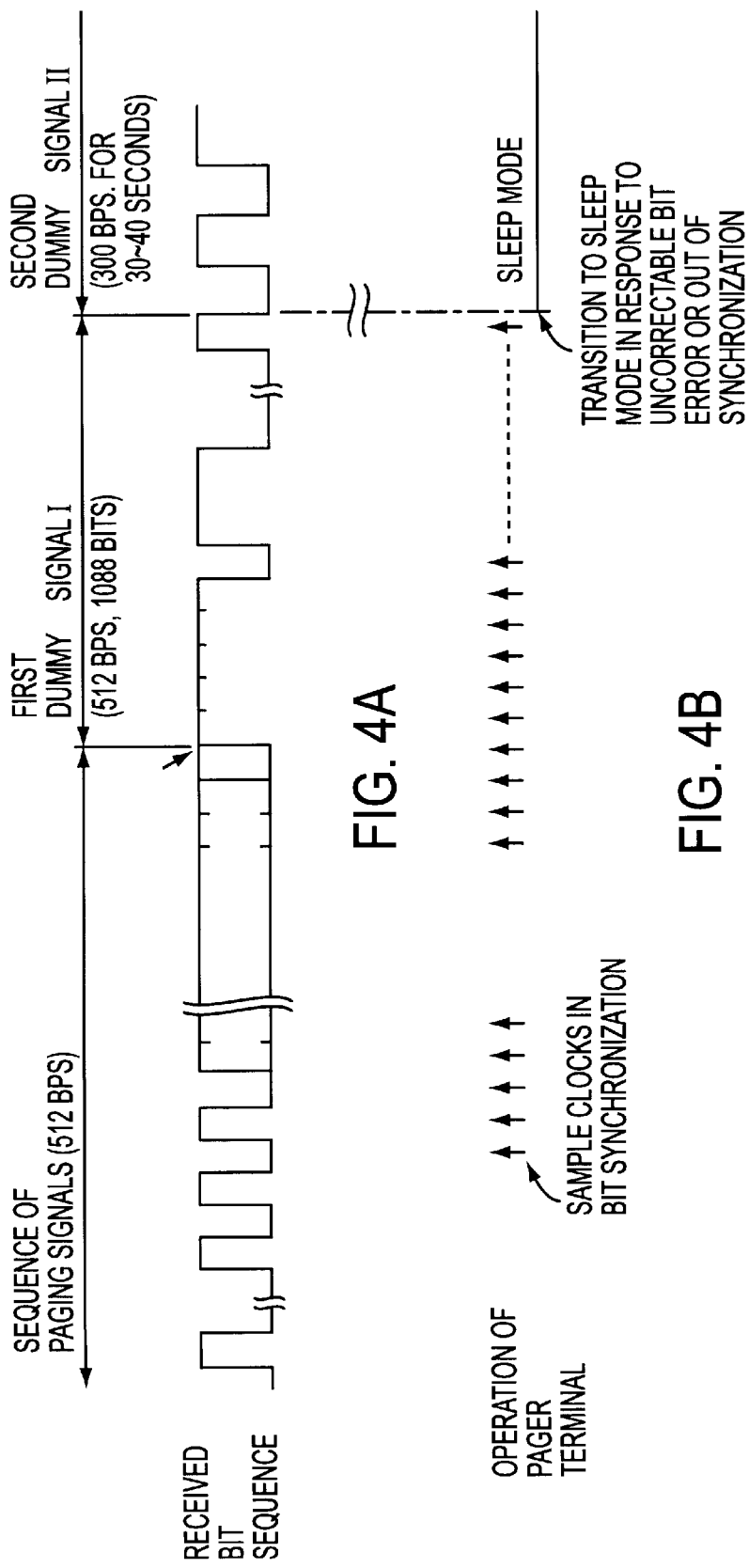

WIRELESS COMMUNICATION SYSTEM COMPULSIVELY TURNING REMOTE TERMINALS INTO INACTIVE STATE

"This application is a continuation of application number 07/874,136, filed Apr. 27, 1992, now pending.

BACKGROUND OF THE INVENTION (1) Field of the Invention

The present invention relates to a wireless communication system, and in particular to a wireless paging system, including a transmitting apparatus and a plurality of wireless terminals.

(2) Description of the Related Art

In wireless paging systems, paging signals are transmitted from a wireless transmission base station to page respective pager terminals which respective persons to be paged carry. Since each pager terminal is usually energized by a battery contained therein, the pager terminal is preferably controlled to be in a sleep mode when the pager terminal is not receiving a paging signal addressing the pager terminal. In. the sleep mode, power from the battery is supplied to respective portions including a wireless signal receiving portion of the pager terminal intermittently for a short time with a predetermined cycle, while the power is constantly supplied to a main control portion. During the above short time in each cycle, the pager terminal tries to detect a preamble signal, and, when the preamble signal is detected, the pager terminal goes into a working mode to try to detect a frame synchronization pattern and an identification number, which is assigned in advance to the pager terminal. When both the frame synchronization pattern and the identification number of the pager terminal are not detected, the pager terminal gets back to the sleep mode.

In addition, to save power in the battery, the pager terminals have a function to automatically go into the sleep mode when no meaningful signal is received after receiving a paging signal addressing the pager terminal.

Conventionally, a batch of accumulated paging signals are asynchronously transmitted from a transmission apparatus in the base station. In a first known wireless paging system, the transmission apparatus is off in intervals between the transmission of the batches of the accumulated paging signals. In a second known wireless paging system, the transmission apparatus is not off and transmits a signal representing an alternating pattern 101010 . . . with a transmission rate which is different from a transmission rate in the above transmission of the paging signals.

In the above first wireless paging system, when the transmission apparatus is off, no meaningful signal (noise only) is detected by the pager terminals, and therefore, the pager terminals goes into the sleep mode. In the above second wireless paging system, when the above signal representing the alternating pattern of a different transmission rate is transmitted from the transmission apparatus, the signal is sampled by the pager terminals at a timing of clock signals synchronized with the above paging signals, and therefore, the sampled signal values form random bit sequences. When the pager terminals detect such random bit sequences, generally, the pager terminal detects neither the frame synchronization pattern nor the identification number, and therefore, conventionally, it was believed that the pager terminals goes into the sleep mode.

However, In the above first wireless paging system, the transmission apparatus must be frequently switched on and off for the beginning and ending of the transmission of the batch of the paging signals. This frequent switching of the transmission apparatus seriously degrades transmission devices in the transmission apparatus. In the second wireless paging system, it is reported that the above random bit sequences sometimes accidentally coincide with the frame synchronization pattern and one of the identification numbers assigned to the subscribers of the wireless paging system. When such a coincidence occurs, the above subscriber is paged by error.

SUMMARY OF THE INVENTION

An object of the present invention is to provide a wireless communication system wherein a remote communication terminal can be turned off without error by remote control.

Another object of the present invention is to provide a wireless paging system wherein all pager terminals can go into the sleep mode without error after transmission of each batch of paging signals.

According to the first aspect of the present invention, there is provided a process for making an operation of an apparatus inactive, by remote control, comprising: a first step for transmitting a wireless signal representing a bit sequence containing at least a predetermined number of bit errors to said apparatus; a second step for receiving said wireless signal by said apparatus; a third step for examining, in said apparatus, the bit sequence represented by a received wireless signal to determine whether or not the number of bit errors contained in the bit sequence is equal to or greater than said predetermined number; and a fourth step for making the operation of the apparatus inactive when it is determined in said third step that at least said predetermined number of bit errors are contained in said bit sequence represented by a received wireless signal.

According to the second aspect of the present invention, there is provided a wireless communication system containing at least one transmission apparatus and at least one communication terminal. The transmission apparatus transmits a wireless signal representing a bit sequence containing at least a predetermined number of bit errors, to the communication terminal. The communication terminal receives the wireless signal to regenerate the bit sequence. The communication terminal contains: a unit for examining the bit sequence represented by a received wireless signal to determine whether or not the number of bit errors contained in the bit sequence is equal to or greater than a predetermined number; and a unit for making the operation of the communication terminal inactive when it is determined that at least the predetermined number of bit errors are contained in the bit sequence represented by a received wireless signal.

According to the third aspect of the present invention, there is provided a process for making an operation of an apparatus inactive by remote control, comprising: a first step for transmitting a wireless signal representing a bit sequence contains no pattern coinciding with said frame synchronization pattern to said apparatus; a second step for receiving said wireless signal by said apparatus; a third step for trying, in said apparatus, to detect the frame synchronization pattern in the bit sequence represented by the received signal; and a fourth step for making the operation of the apparatus inactive when the frame synchronization pattern detection means fails to detect the frame synchronization pattern in the bit sequence represented by the received signal.

According to the fourth aspect of the present invention, there is provided a wireless communication system containing at least one transmission apparatus and at least one communication terminal. The transmission apparatus transmits a wireless signal representing a bit sequence containing at least a predetermined number of bit errors to the communication terminal. The communication terminal receives the wireless signal to regenerate the bit sequence. The communication terminal contains: a unit for examining the a bit sequence represented by a received wireless signal to determine whether or not the bit sequence contains the predetermined frame synchronization pattern; and a unit for making the operation of the communication terminal inactive when it is determined that the bit sequence does not contain the predetermined frame synchronization pattern.

According to the fifth aspect of the present invention, there is provided a wireless paging system comprising a plurality of pager terminals and at least one transmission apparatus for transmitting a wireless paging signal representing a first bit sequence to the plurality of pager terminals. The transmission apparatus contains: a paging signal transmission unit and a sleep mode signal transmission unit. The paging signal transmission unit transmits the paging signal. The paging signal contains a bit error correction code based on a predetermined rule for bit error detection and correction. In accordance with the predetermined rule, at least one bit error contained in the first bit sequence can be detected, and, when the number of the detected bit error is less than a predetermined number, the detected bit error can be corrected. The above sleep mode signal transmission unit transmits, following an end of the transmission of the paging signal, a sleep mode signal representing a second bit sequence containing at least the above predetermined number of bit errors. Each of the plurality of pager terminals contains: a receiving unit, an examining unit, and a sleep mode control unit. The receiving unit receives a wireless signal, and regenerates a bit sequence represented by the above received signal. The examining unit examines the first and second bit sequences represented by the received signal to detect a bit error contained therein, assuming that the received signal contains a bit error correction code based on the above predetermined rule. The sleep mode control unit makes the operation of the pager terminal inactive when the examining unit detects bit errors of a number equal to or more than the above predetermined number. The pager terminals may further have an intermittent watching unit for intermittently making the operation of the pager terminal active while the pager terminal is in the inactive state.

According to the sixth aspect of the present invention, in addition to the above construction of the fifth aspect of the present invention, the above paging signal is formatted in a frame, further contains a frame synchronization pattern for indicating a reference of a frame phase, and the above sleep mode signal does not contain a pattern equal to the above frame synchronization pattern. Each of the plurality of pager terminals further contains a frame synchronization pattern detection unit for detecting the frame synchronization pattern in the received signal. The sleep mode control unit makes the operation of the pager terminal inactive when the frame synchronization pattern detection unit detects an absence of the frame synchronization pattern in the received signal.

BRIEF DESCRIPTION OF THE DRAWINGS

In the drawings:

FIG. 4A is a diagram indicating a sequence of signals transmitted from the wireless transmission base station to the pager terminals according to the present invention;

FIG. 4B is a diagram indicating the operations of each pager terminal when receiving the sequence of signals of FIG. 4A;

FIG. 4C is a diagram indicating the first dummy signal I in the sequence of signals of FIG. 4A;

DESCRIPTION OF THE PREFERRED EMBODIMENTS

Figure 1:
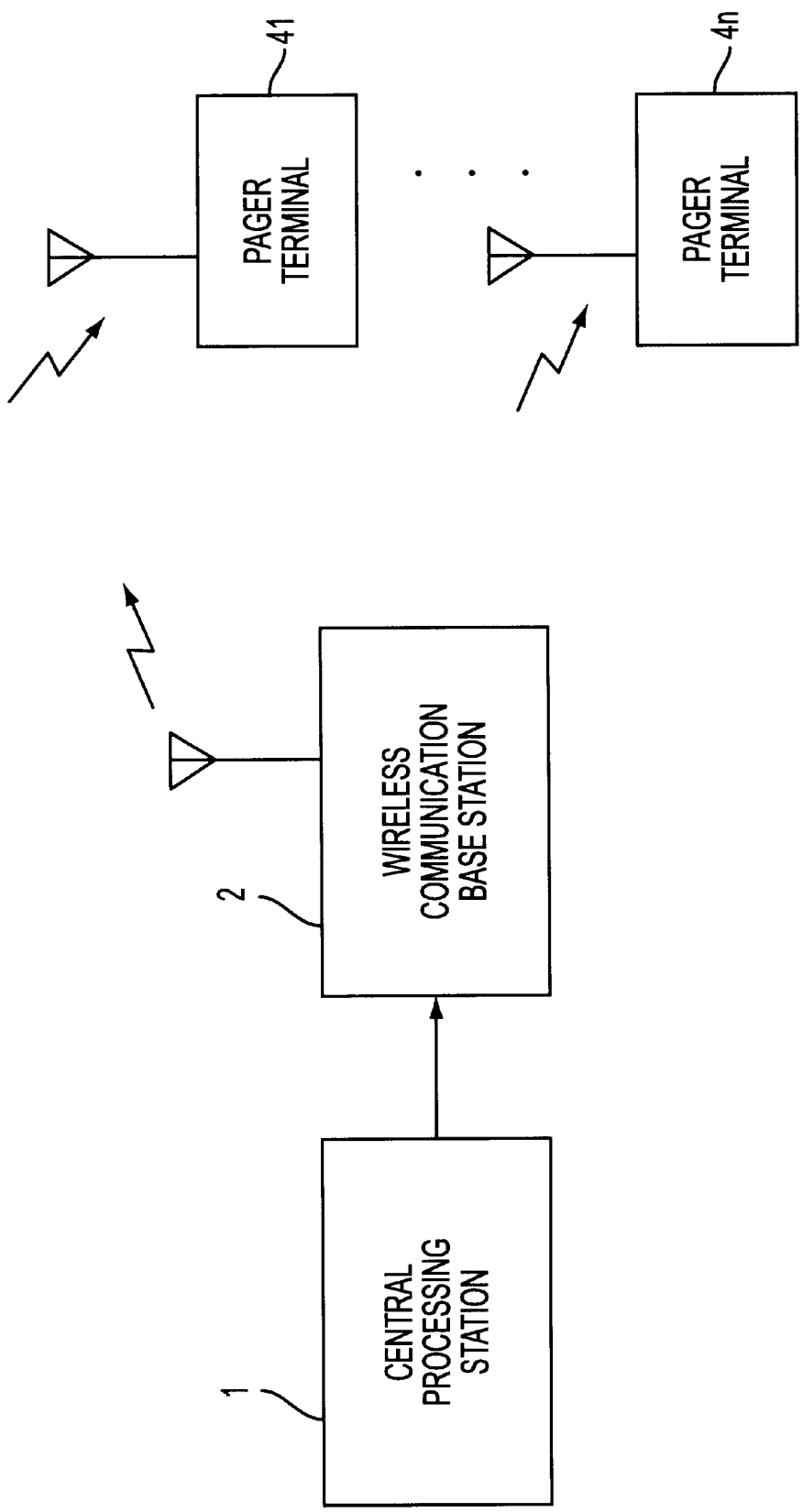
FIGS. 1 is a diagram indicating an outline of the wireless paging system.

Outline of Wireless Paging System (FIG. 1)

FIGS. 1 is a diagram indicating an outline of the wireless paging system. In FIG. 1, reference numeral 1 denotes a central control station, 2 denotes a wireless transmission base station, and 41 to 4n each denote a pager terminal.

The central control station 1 receives requests (calls) for paging pager terminals, for example, through a public telephone network (not shown), obtains identification numbers of the pager terminals respectively requested by the requests, accumulates the received requests for a predetermined time, for example, 30 to 40 seconds, and generates a frame format of paging signals. The paging signals in the form of a frame is transmitted through a private or leased line to the wireless transmission base station 2. The wireless transmission base station 2 contains a wireless transmission apparatus (not shown in FIG. 1, and explained later), and transmits the above paging signals to the pager terminals as wireless signals. Each pager terminal receives the transmitted wireless signals, and examines whether or not the received signal contains the identification number of the pager terminal. When the identification number of the pager terminal is detected, the pager terminal receives information which is contained in the paging signal containing the identification number, and beeps and/or displays the information. Details of the constructions and the operations of the central control station 1, the wireless transmission base station 2, and the pager terminals 41 to 4n are explained later. Although only one wireless transmission base station is indicated in FIG. 1, generally, a plurality of wireless transmission base stations are provided for a plurality of service areas, respectively.

Conventional Sequence of Signals Transmitted from Wireless Transmission Base Station (FIGS. 2A, 2B, and 3A to 3G)

Figures 2A, 2B:
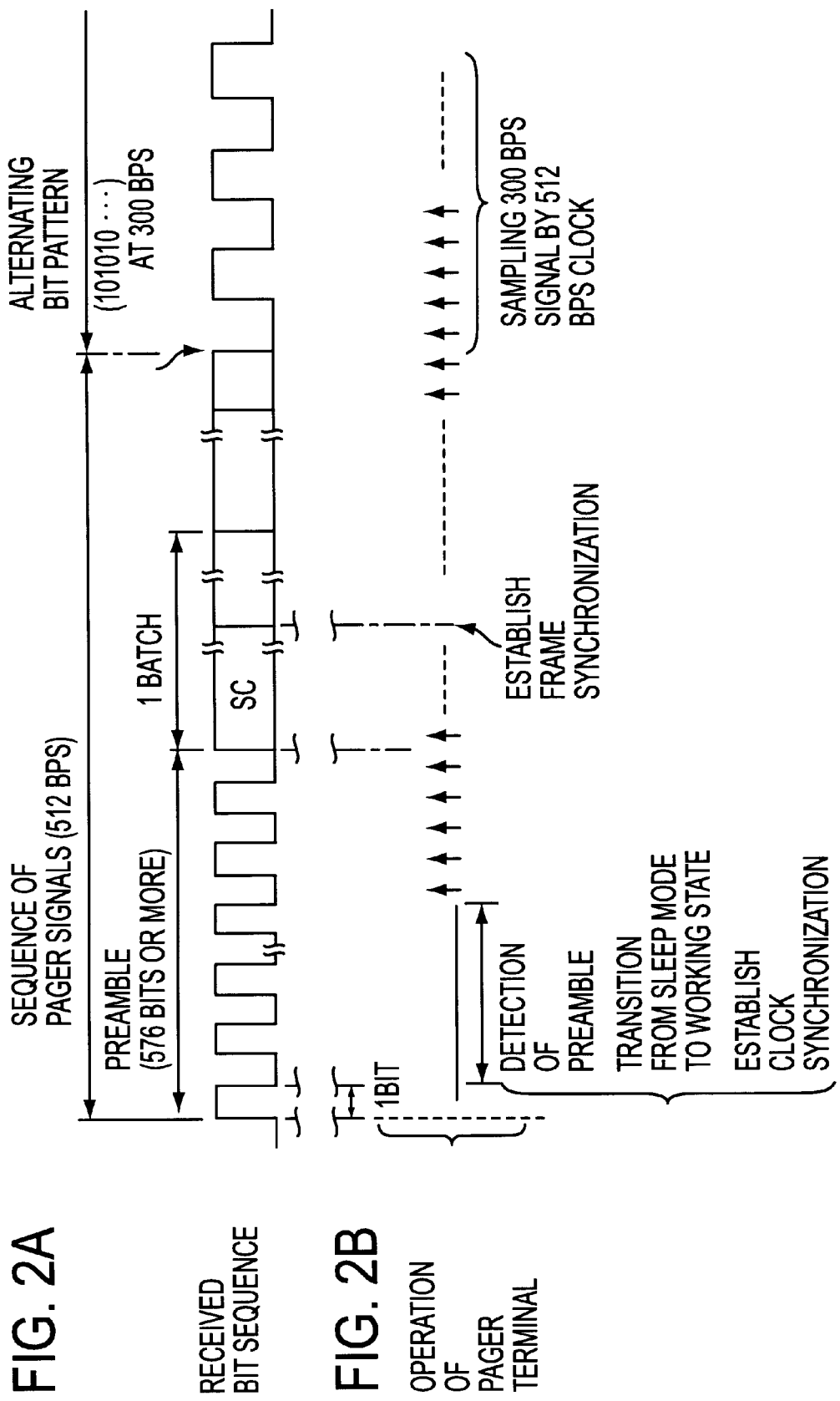
FIG. 2A is a diagram indicating a conventional sequence of signals transmitted from the wireless transmission base station to the pager terminals.
FIG. 2B is a diagram indicating the operations of each pager terminal when receiving the sequence of signals of FIG. 2A.

FIG. 2A is a diagram indicating a conventional sequence of signals transmitted from the wireless transmission base station to the pager terminals. As indicated in FIG. 2A, paging signals are transmitted from the wireless transmission base station 2 in a sequence of one or more batches of paging signals. Further, the detailed formats of paging signals contained in the above sequence of one or more batches, are indicated in FIGS. 3A to 3G. The formats of FIGS. 2A, and 3A to 3G are in accordance with the POCSAG (British Post Office Code Standardization Advisory Group) system.

Figure 3A:
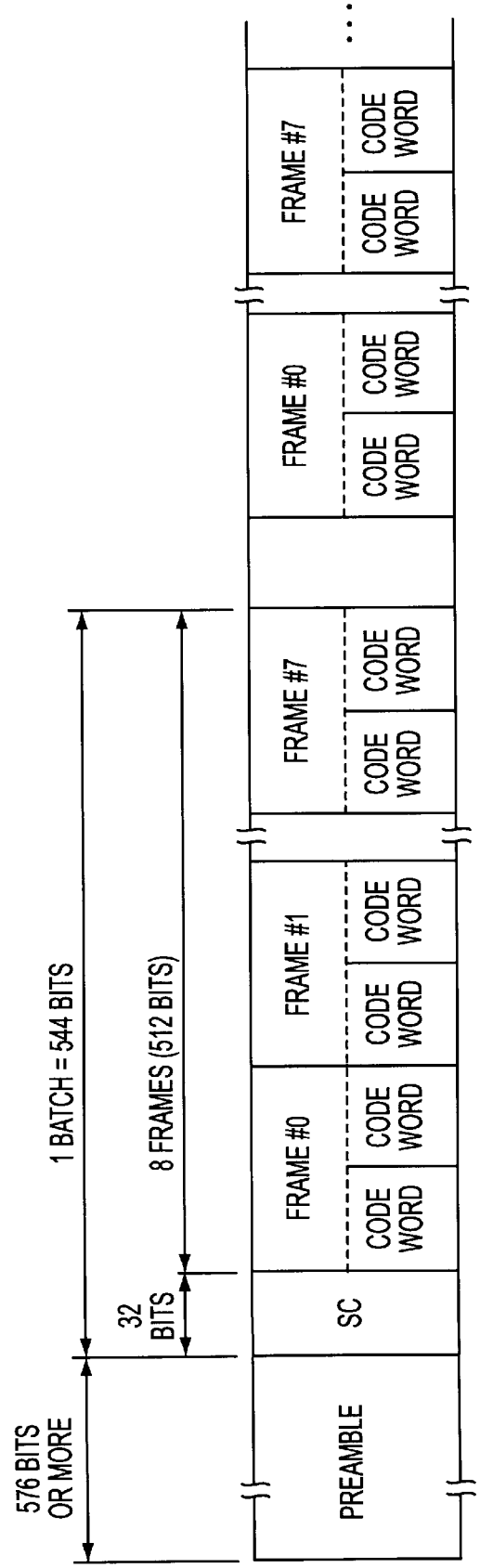
FIGS. 3A to 3G are diagrams indicating the detailed POCSAG formats of paging signals transmitted from the wireless transmission base station.

As indicated in FIGS. 2A and 3A, the sequence of one or more batches of paging signals is initiated by a preamble signal representing an alternating bit pattern 10101010 . . . The length of the preamble signal is 576 bits or more. The above one or more batches follows the preamble signal, and each batch is initiated by a frame synchronization pattern denoted by SC and having a length of thirty-two bits, and contains eight frames. Each frame is comprised of two code words each having a length of thirty-two bits. The frame synchronization pattern SC is indicated in FIG. 3F. Each paging signal is comprised of an ID code word containing the identification number of a pager terminal to be paged, and one or more message code words following the code word containing the identification number, and containing information to be imparted to a person carrying the pager terminal.

Figure 3B:
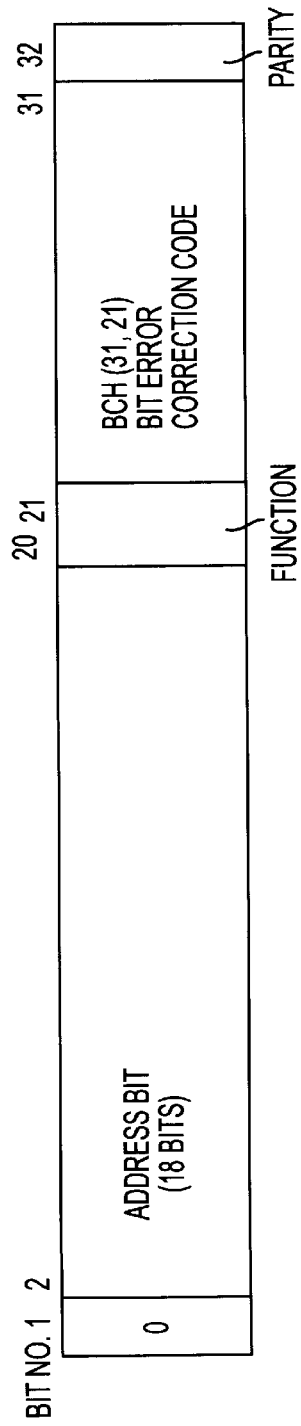

FIG. 3B indicates the format of the ID code word containing an identification number of a pager terminal to be paged. When the first bit of a code word is "0" as indicated in FIG. 3B, this code word is an ID code word. The ID code word of FIG. 3B contains an identification number of a pager terminal to be paged, in the field denoted by "ADDRESS BITS" and having a length of eighteen bits. The field denoted by "FUNCTION BITS" having a length of two bits, is used for designating modes of imparting information transmitted from the wireless transmission base station, for example, designating a beeping mode. The ID code word of FIG. 3B also contains an error correction code having a length of ten bits, and a parity check bit. The error correction code in FIGS. 3B to 3E is a Bose-Chaudhuri-Hocquenghem code BCH (31, 21) which can correct at most two error bits and detect three error bits contained in the code word. The error correction code is contained in the code words, since the pager terminals are generally moving with persons carrying them, and an error is likely to occur due to fading and the like.

Figure 3C:
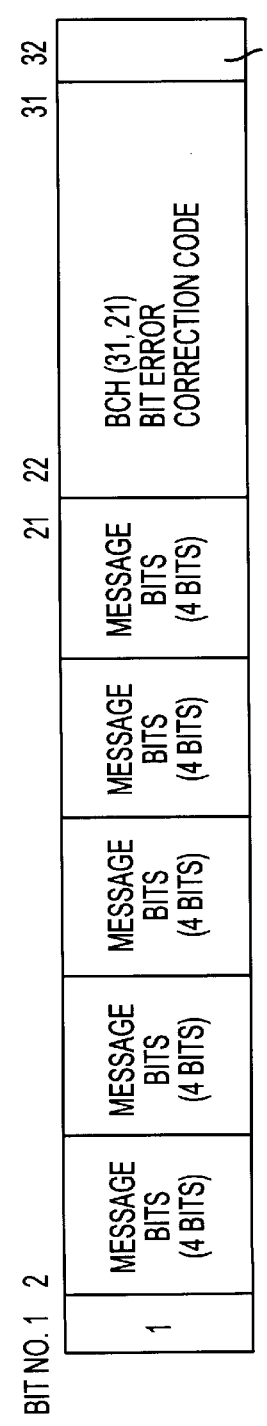
Figure 3D:
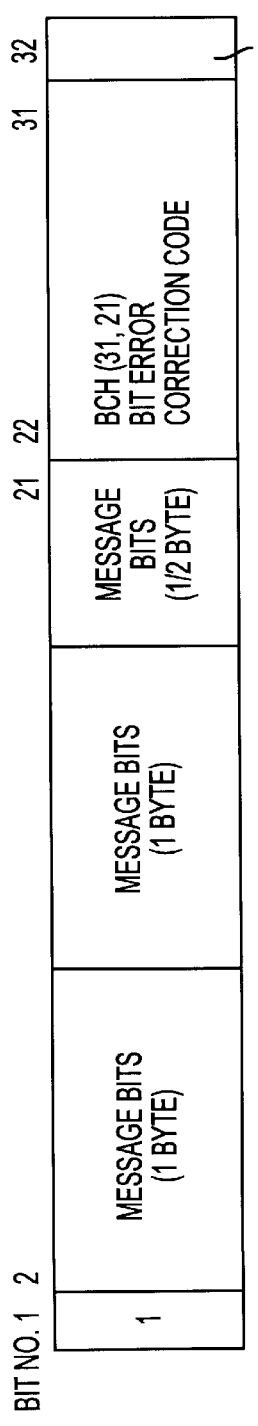
Figures 3E, 3F, 3G:
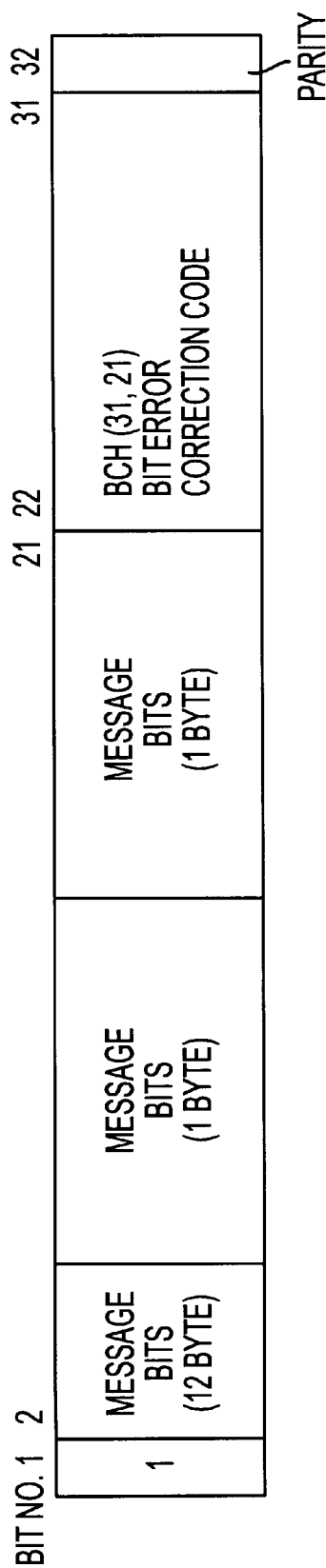

FIGS. 3C to 3E each indicate a format of the message code word containing message information to be imparted to a person carrying the pager terminal. When the first bit of a code word is "1" as indicated in FIGS. 3C to 3E, this code word is a message code word. As indicated in FIGS. 3C to 3E, the code words of FIGS. 3C to 3E each contain a field for a message having a length of twenty bits, a field of the error correction code, and a parity bit. The error correction code and the parity bit are the same as the format of FIG. 3B. The field for a message may be divided into five regions each containing character information of four bits as indicated in FIG. 3C; or into two one-byte regions and a half-byte region as indicated in FIGS. 3D and 3E. The format of FIG. 3C is applicable when the message is transmitted by a sequence of numerals, and the format of FIGS. 3D and 3E are applicable when the message is transmitted by a sequence of characters. The format of FIG. 3E is used for a code word transmitted following a code word using the format of FIG. 3D. Namely, the last half-byte region in FIG. 3D and the first half-byte region in FIG. 3E indicate a one-byte character, and are combined in the pager terminal after these two code words are received to recognize the character.

FIG. 3G indicates a pattern of an idle code word. The idle code word is used for indicating a code word containing no information, and is transmitted at the end of a sequence of one or more batches of paging signals, as indicated by "I" in FIG. 2A.

In addition, all the signals in the above preamble signal and the sequence of one or more batches of paging signals, are transmitted at a transmission rate of 512 bps.

Returning to FIG. 2A, as explained before in the "Description of the Related Art", conventionally, a signal representing an alternating pattern 101010 . . . is transmitted following the end of the above sequence of one or more batches of paging signals with a transmission rate which is different from a transmission rate of the sequence, for example, 300 bps. FIG. 2B is a diagram indicating the operations of each pager terminal when receiving the sequence of signals of FIG. 2A. As indicated in FIG. 2B, clock synchronization is established in each pager terminal by receiving the preamble signal and extracting timing of the preamble signal of a transmission rate of 512 bps, and then frame synchronization is established by detecting the frame synchronization pattern SC. However, when the above sequence of one or more batches of paging signals is ended, thereafter, the above signal of a different transmission rate, 300 bps, is received by the pager terminal. Since the pager terminal is still operating with the clock synchronizing with the preamble signal of the transmission rate 512 bps, the above signal of 300 bps is sampled with the clock of 512 bps, and thus a random bit sequence is generated from the signal of 300 bps. Generally, when receiving the random bit sequence, the pager terminal goes into the sleep mode as expected. Nevertheless, as mentioned before, it is reported that the above random bit sequence sometimes accidentally coincides with the frame synchronization pattern SC and one of the identification numbers assigned to the subscribers of the wireless paging system, and the above subscriber is paged by error.

Sequence of Signals Transmitted by Present Invention (FIGS. 4A, 4B, 5A and 5B)

FIG. 4A is a diagram indicating a sequence of signals transmitted from the wireless transmission base station to the pager terminals according to the present invention, and FIG. 4B is a diagram indicating the operations of each pager terminal when receiving the sequence of signals of FIG. 4A. As indicated in FIG. 4A, according to the present invention, the wireless transmission base station 2 transmits, following the end of the transmission of the paging signal, a signal (denoted as "first dummy signal I" in FIG. 4A) representing a bit sequence containing bit errors the number of which is more than the above number of bits which can be corrected by using the error correction code, where the bit sequence does not contain the above frame synchronization pattern SC. When the BCH (31, 21) code is used for correcting a bit error as indicated in FIG. 4A, the number of bit errors contained in each code word in the above first dummy signal I is more than three since at most two error bits contained in each code word can be corrected by using the BCH (31, 21) code. The length of the first dummy signal I may be, for example, 1088 bits corresponding to the length of two batches of paging signals of FIGS. 3A to 3G. Corresponding to the above transmission of the first dummy signal I, each pager terminal must be constructed so that, when the pager terminal continually detects the first dummy signal I for a duration equal to or shorter than the above 1088 bits, the pager terminal goes into the sleep mode. Thus, the pager terminal can be compulsively turned into the sleep mode after the end of a sequence of one or more batches of paging signals, as indicated in FIG. 4B. The first dummy signal I satisfying the above condition can be generated, for example, by repeating the pattern indicated in FIG. 4C for the above duration of 1088 bits.

In addition, generally, each pager terminal may detect the frame synchronization pattern SC at the beginning of every batch of the paging signals, or may not. The pager terminal detecting the frame synchronization pattern SC at the beginning of every batch of paging signals, can detect the absence of the frame synchronization pattern SC in the duration of the first dummy signal I, and then the pager terminal goes into the sleep mode. The pager terminal not detecting the frame synchronization pattern SC at the beginning of every batch of paging signals, may not be able to detect the absence of the frame synchronization pattern SC in the duration of the first dummy signal I. However, the pager terminal then examines each cord word to determine whether or not a bit error is contained in each cord word, and whether or not the bit error can be corrected. When it is determined by the pager terminal that bit errors which cannot be corrected are included in each code word, and that an uncorrectable bit error occurs for a duration equal to or shorter than the above 1088 bits, the pager terminal goes into the sleep mode.

As indicated in FIG. 4A, after the duration of the above first dummy signal I for 1088 bits, the wireless transmission base station 2 transmits a signal (denoted as "second dummy signal II") representing an alternating pattern 101010 . . . with a transmission rate, for example, 300 bps, which is different from a transmission rate, 512 bps, in the above transmission of the paging signals and the first dummy signal I. The transmission of the second dummy signal II is continued until the next sequence of one or more batches of paging signals begins with the preamble signal.

Figures 5A, 5B:
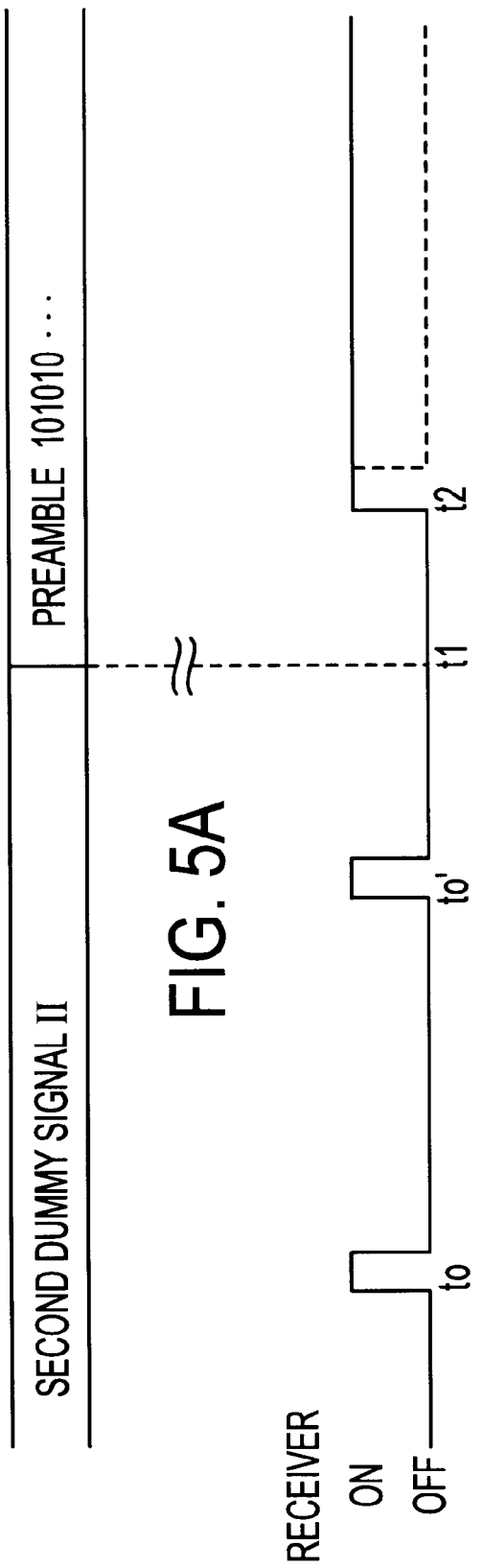
FIG. 5A is a diagram indicating the durations of the transmission of the second dummy signal II and the beginning of the transmission of the preamble signal.
FIG. 5B is a diagram indicating operations of the pager terminal in the sleep mode in the durations of FIGS. 5A.

FIG. 5A is a diagram indicating the duration of the transmission of the second dummy signal II and the duration at the beginning of the transmission of the preamble signal, and FIG. 5B is a diagram indicating operations of the pager terminal in the sleep mode in the durations of FIGS. 5A and 5B. As indicated in FIG. 5B, the pager terminal temporarily goes into a working state for a predetermined duration, for example, a length of thirty-two bits once every batch period (544 bps), which is less than the duration of the preamble signal, 576 bits. In the temporary working state for the thirty-two bits, the pager terminal determines whether or not the preamble signal is received. When the preamble signal is not detected in the duration, the pager terminal again goes into the sleep mode as indicated for the times t0 and t0' in FIG. 5B. When the preamble signal is detected in the above duration as indicated for the time t2 in FIG. 5B, the pager terminal continues to receive the following signal to detect the frame synchronization pattern SC, and then reads and examines the following code words as indicated in FIGS. 3A to 3G. Although not shown, in practice, each pager terminal is assigned, in advance, one of the eight frames in one batch of the format of FIG. 3A, and each pager terminal goes into the working state only in the timing (frame phase) of the assigned frame.

Figure 6:
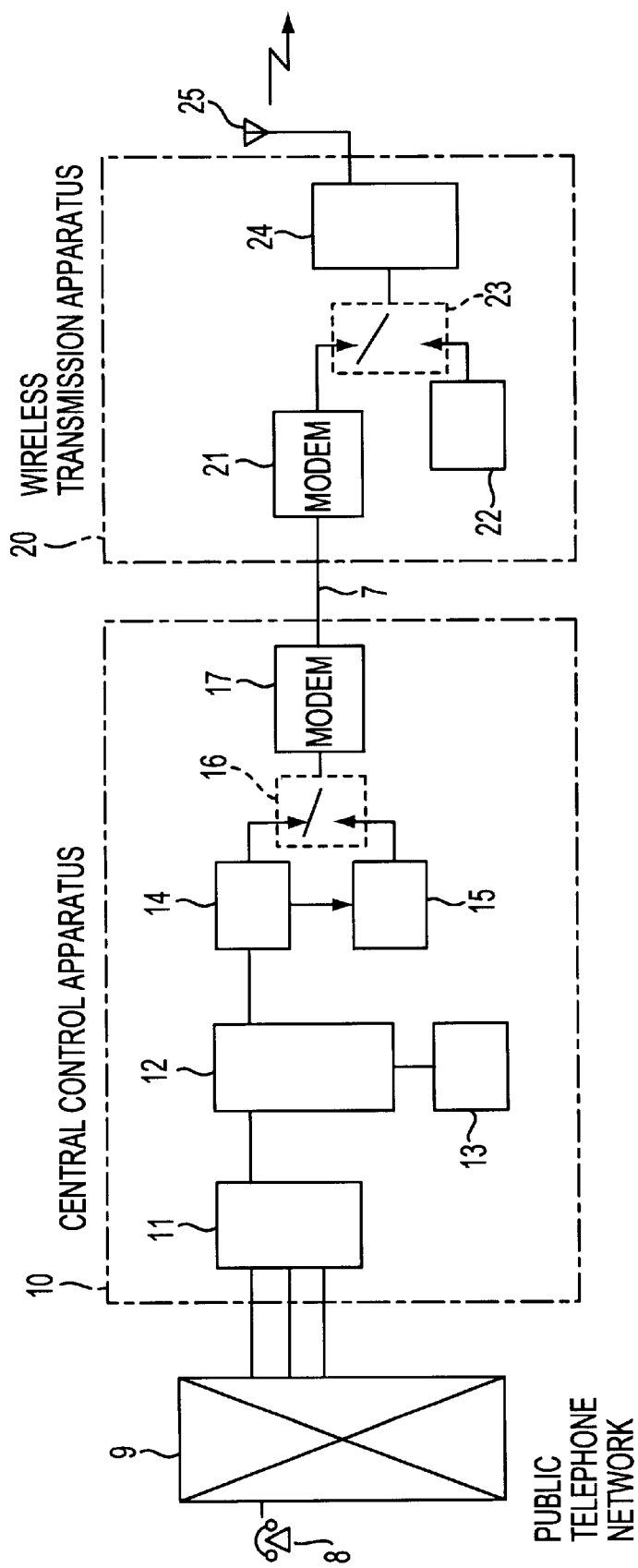
FIG. 6 is a diagram indicating the construction of the central control apparatus and the wireless transmission apparatus in an embodiment of the present invention.

Central Control Apparatus and Wireless Transmission Apparatus (FIG. 6)

FIG. 6 is a diagram indicating the construction of the central control apparatus and the wireless transmission apparatus in an embodiment of the present invention. In FIG. 6, reference numeral 7 denotes a private or leased line, 8 denotes a telephone set at a subscriber, 9 denotes a public telephone network, 10 denotes a central control apparatus, 11 denotes an incoming call processing unit, 12 denotes a paging signal receiving unit, 13 denotes a subscriber information memory, 14 denotes a paging signal generating unit, 15 denotes a first dummy signal generating unit, 16 denotes a selector switch, 17 denotes a MODEM, 20 denotes a wireless transmission apparatus, 21 denotes a MODEM, 22 denotes a second dummy signal generating unit, 23 denotes a selector switch, 24 denotes a transmitter unit, and 25 denotes an antenna.

The above central control apparatus 10 is contained in a central control station, and the wireless transmission apparatus is provided in the wireless transmission base station. The incoming call processing unit 11 receives calls for paging pager terminals, for example, through a public telephone network 9. The paging signal receiving unit 12 contains therein a memory (not shown) storing identification numbers of pager terminals corresponding to subscribers, and searches the memory to obtain identification numbers corresponding to the respective calls, and accumulates the received calls in the subscriber information memory 13 for a predetermined time, for example, 30 to 40 seconds. The paging signal generating unit 14 generates the frame format of FIGS. 3A to 3G containing the accumulated paging signals. The first dummy signal generating unit 15 generates the above-mentioned first dummy signal I. The selector switch 16 receives the formatted paging signals from the paging signal generating unit 14 and the first dummy signal I from the first dummy signal generating unit 15, and selects one of them to supply the selected one to the MODEM 17. The selected signal is transmitted through the selector switch 16, the MODEM 17, and the private or leased line 7 to the wireless transmission apparatus 20 in the wireless transmission base station.

The above signal transmitted from the central control station is received through the MODEM 21 and the selector switch 23 by the transmitter unit 24 when the selector switch 23 selects the output of the MODEM 21. The second dummy signal generating unit 22 generates the second dummy signal II to apply it to the selector switch 23. The second dummy signal II is supplied to the transmitter unit 24 when the selector switch 24 selects the output of the second dummy signal generating unit 22. The transmitter unit 24 modulates the signal selected by the selector switch 23, and transmits the modulated signal through the antenna 25 to the pager terminals located in a predetermined service area, in a form of a wireless signal.

In the above construction of the central control apparatus 10 and the wireless transmission apparatus 20, the units except the selector switches 16 and 23 and the first and second dummy signal generating units are conventionally known. To realize the above-mentioned functions according to the present invention, the selector switch 16 is controlled to select the output of the paging signal generating unit 14 when the above-mentioned sequence of one or more batches of paging signals is to be transmitted, and selects the output of the first dummy signal generating unit 15 for the duration of 1088 bits after the end of the above sequence of paging signals. In addition, the selector switch 23 selects the output of the MODEM 21 from the beginning of the preamble signal initiating the above sequence of paging signals until the above duration of the first dummy signal I is ended, and selects the output of the second dummy signal generating unit 22 after the end of the duration of the first dummy signal I before the beginning of the next preamble signal.

The above first dummy signal generating unit 15 may be provided on the input side of the selector switch 23 in the wireless transmission apparatus 20 instead of the central control apparatus 10. In this case, the selector switch 16 is not necessary, and the selector switch 23 must have three inputs and one output, instead of two inputs and one output, and select one of the outputs of the MODEM 21 and the first and second dummy signal generating units 15 and 22. Further, it is possible to provide both the first and second dummy signal generating units 15 and 22 in the central control apparatus 10, instead of the wireless transmission apparatus 20. In this case, the selector switch 23 is not necessary, and the selector switch 16 must have three inputs and one output, instead of two inputs and one output, and select one of the outputs of the paging signal generating unit 14 and the first and second dummy signal generating units 15 and 22.

Figure 7:
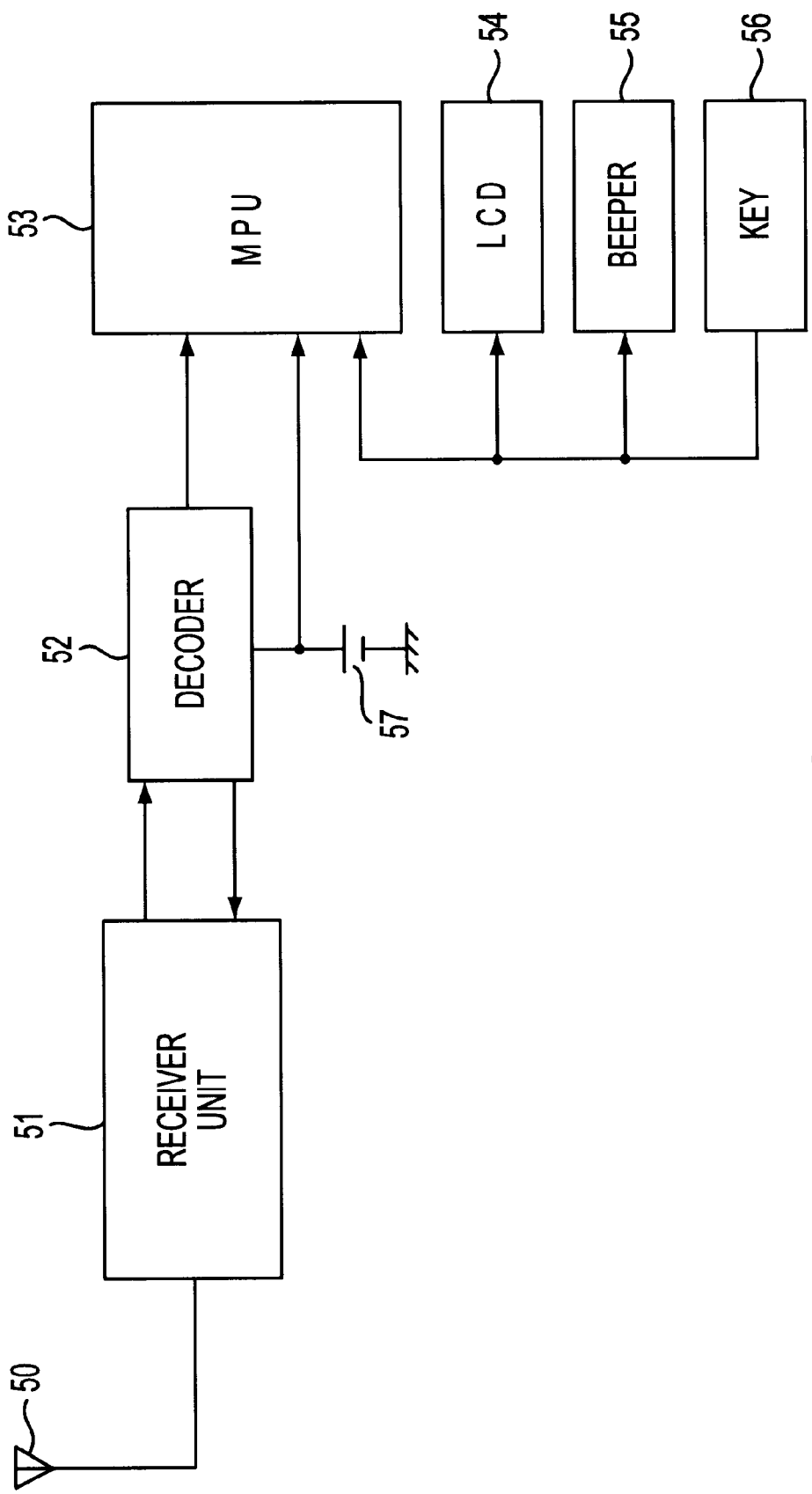
FIG. 7 is a diagram indicating the construction of the pager terminal in the embodiment of the present invention.

Pager Terminal (FIG. 7)

FIG. 7 is a diagram indicating the construction of the pager terminal in the embodiment of the present invention. In FIG. 7, reference numeral 50 denotes an antenna, 51 denotes a receiver unit, 52 denotes a decoder, 53 denotes a microprocessor unit (MPU), 54 denotes a liquid crystal display unit, 55 denotes a beeper, 56 denotes a key input unit, and 57 denotes a battery.

The above-mentioned wireless signal transmitted from the wireless transmission apparatus 20 is received through the antenna 50 by the receiver unit 51, and then decoded by the decoder 52 to be supplied to the MPU 53. The above-mentioned sampling of the received signal is carried out in the receiver unit 51, and the above-mentioned error check and correction may be carried out in a logic circuit (not shown) provided in the decoder, or may be carried out by the MPU 53. The MPU 53 is provided with a memory storing a program, and the above-mentioned operation of the pager terminal is carried out in accordance with the program. The liquid crystal display unit 54 is provided to display a message transmitted with the paging signal, and the beeper 55 is provided to beep in response to the paging signal. Both the operations of the liquid crystal display unit 54 and the beeper 55 are controlled by the MPU 53. The key input unit 56 is provided for manually inputting commands for designating modes of the beeper 55, or for scrolling the display, and the like. In particular, the above-mentioned operation of switching the state of the pager terminal between the working mode (state) and the sleep mode, is controlled by the MPU 53. This switching may be carried out by controlling a power supply from the battery 57 to the receiver unit 51 and the other components 52, 54, 55, and 56. Otherwise, the MPU 53 may be replaced with a hardware logic circuit designed to operate in the same way as the above MPU 53.

Other Communication Systems

Although the above explanations are made for the wireless paging system only, it is possible for persons skilled in the art to apply the present invention to all wireless communication systems containing at least one transmission apparatus and at least one wireless communication terminal, and the transmission apparatus transmits a wireless signal representing a bit sequence containing a bit error correction code and/or a frame synchronization pattern.

What is claimed is:

1. A wireless communication system, comprising:
at least one wireless communication terminal; and
at least one transmission apparatus for transmitting a wireless signal containing a preamble portion and a non-preamble portion, to said at least one wireless communication terminal;
said transmission apparatus comprises turn-off signal transmission means for transmitting, as a part of the non-preamble portion, a turn-off signal representing a bit sequence containing no pattern coinciding with a predetermined frame synchronization pattern;
said at least one wireless communication terminal comprises:
receiving means for receiving a wireless signal as a received wireless signal, and regenerating a bit sequence represented by the non-preamble portion of the received wireless signal,
frame synchronization pattern detection means for trying to detect said predetermined frame synchronization pattern in the bit sequence represented by the non-preamble portion of the received signal, and
sleep mode control means for changing an operation mode of the wireless communication terminal from a working mode to a sleep mode to reduce power consumption of the wireless communication terminal when the frame synchronization pattern detection means fails to detect the frame synchronization pattern in the bit sequence represented by the non-preamble portion of the received signal, in the working mode operation.

2. A wireless communication terminal, comprising:
receiving means for receiving a wireless signal containing a preamble portion and a non-preamble portion, as a received wireless signal, and regenerating a bit sequence represented by the non-preamble portion of the received wireless signal,
frame synchronization pattern detection means for attempting to detect a predetermined frame synchronization pattern in the bit sequence represented by the non-preamble portion of the received wireless signal, and
sleep mode control means for changing an operation mode of the wireless communication terminal from a working mode to a sleep mode to reduce power consumption of the wireless communication terminal when the frame synchronization pattern detection means fails to detect the frame synchronization pattern in the bit sequence represented by the non-preamble portion of the received wireless signal, in the working mode operation.

3. A method of controlling a pager, comprising:
producing a bit sequence that does not contain a frame synchronization pattern;
transmitting a preamble portion followed by a non-preamble portion representing the bit sequence, to the pager; and
changing an operation mode of the pager from a working mode to a sleep mode to reduce power consumption of the pager when a frame synchronization pattern is not detected by the pager in the non-preamble portion.

4. A process for making an operation of an apparatus inactive, by remote control, said process comprising:
transmitting to said apparatus a wireless signal containing a preamble portion and a non-preamble portion, said non-preamble portion representing a bit sequence containing no pattern coinciding with a frame synchronization pattern;
receiving said wireless signal by said apparatus;
trying, in said apparatus, to detect the frame synchronization pattern in the bit sequence represented by the non-preamble portion of the received signal; and
changing the operation mode of the apparatus from a working mode to a sleep mode to reduce power consumption of the apparatus when the frame synchronization pattern detection fails to detect the frame synchronization pattern in the bit sequence represented by the non-preamble portion of the received signal.

5. A wireless communication system, comprising:
a receiving device receiving a wireless signal containing a preamble portion and a non-preamble portion;
a pattern detector determining the presence of a predetermined pattern in the non-preamble portion of said received wireless signal; and a mode controller changing the operation mode of said receiving device from a first mode to a second mode when said pattern detector fails to determine the presence of said predetermined pattern.

6. A method of remotely changing the operation mode of a receiving device, comprising:

receiving a wireless signal at the receiving device, wherein the wireless signal includes a preamble portion and a non-preamble portion;

determining, at the receiving device, the presence of a predetermined pattern in the non-preamble portion of the wireless signal; and changing the operation mode of the receiving device from a first mode to a second mode if the determining step fails to detect the predetermined pattern.

* * * * *